United States Patent
Vakrat et al.

(10) Patent No.: US 8,106,972 B2
(45) Date of Patent: Jan. 31, 2012

(54) APPARATUS AND METHOD FOR NOISE REDUCTION WITH 3D LUT

(75) Inventors: Dudi Vakrat, Iyar (IL); Ben-Zion Shaick, Zichron Yaakov (IL)

(73) Assignee: Zoran Corporation, Sunnyvale, CA (US)

( * ) Notice: Subject to any disclaimer, the term of this patent is extended or adjusted under 35 U.S.C. 154(b) by 578 days.

(21) Appl. No.: 12/355,713

(22) Filed: Jan. 16, 2009

(65) Prior Publication Data
US 2009/0185058 A1    Jul. 23, 2009

Related U.S. Application Data

(60) Provisional application No. 61/022,157, filed on Jan. 18, 2008.

(51) Int. Cl.
*H04N 5/217* (2011.01)
*H04N 5/335* (2011.01)

(52) U.S. Cl. .......................................... 348/241; 348/308
(58) Field of Classification Search .................. 348/241, 348/308
See application file for complete search history.

(56) References Cited

U.S. PATENT DOCUMENTS

| 6,807,300 B1 | 10/2004 | Gindele et al. |
| 2005/0006583 A1 | 1/2005 | Nozoe et al. |
| 2006/0226337 A1 | 10/2006 | Lim et al. |

*Primary Examiner* — William Choi
(74) *Attorney, Agent, or Firm* — Frommer Lawrence & Haug LLP; John W. Branch

(57) ABSTRACT

A device for noise reduction is provided. The device includes a noise reduction three-dimensional look-up table (LUT) and a noise reduction unit. The noise reduction LUT transforms an input image into a noise reduction factor and noise reduction threshold for each color component of each pixel of the input image. The noise reduction unit performs noise reduction on the input image based on the noise reduction factors and noise reduction thresholds determined from the noise reduction LUT.

17 Claims, 4 Drawing Sheets

APPARATUS AND METHOD FOR NOISE REDUCTION WITH 3D LUT

CROSS-REFERENCE TO RELATED APPLICATIONS

This application claims the benefit of U.S. Provisional Patent Application 61/022,157, filed Jan. 18, 2008, the benefit of the earlier filing date of which is hereby claimed under 35 U.S.C. §119(e) and which is further incorporated by reference.

FIELD OF THE INVENTION

The invention is related to noise reduction, and in particular but not exclusively, to a method and circuit for converting an image into noise reduction factors and threshold to use in noise reduction of the image.

BACKGROUND OF THE INVENTION

Digital cameras use photosensor arrays to capture images. During image capture, an image is focused on a photosensor array, and individual photo-receptive elements of the array detect photons. In many digital imaging applications it is desirable to amplify the signal component of a digital image while reducing the noise component of the image.

BRIEF DESCRIPTION OF THE DRAWINGS

Non-limiting and non-exhaustive embodiments of the present invention are described with reference to the following drawings, in which.

DETAILED DESCRIPTION

Figure 1:
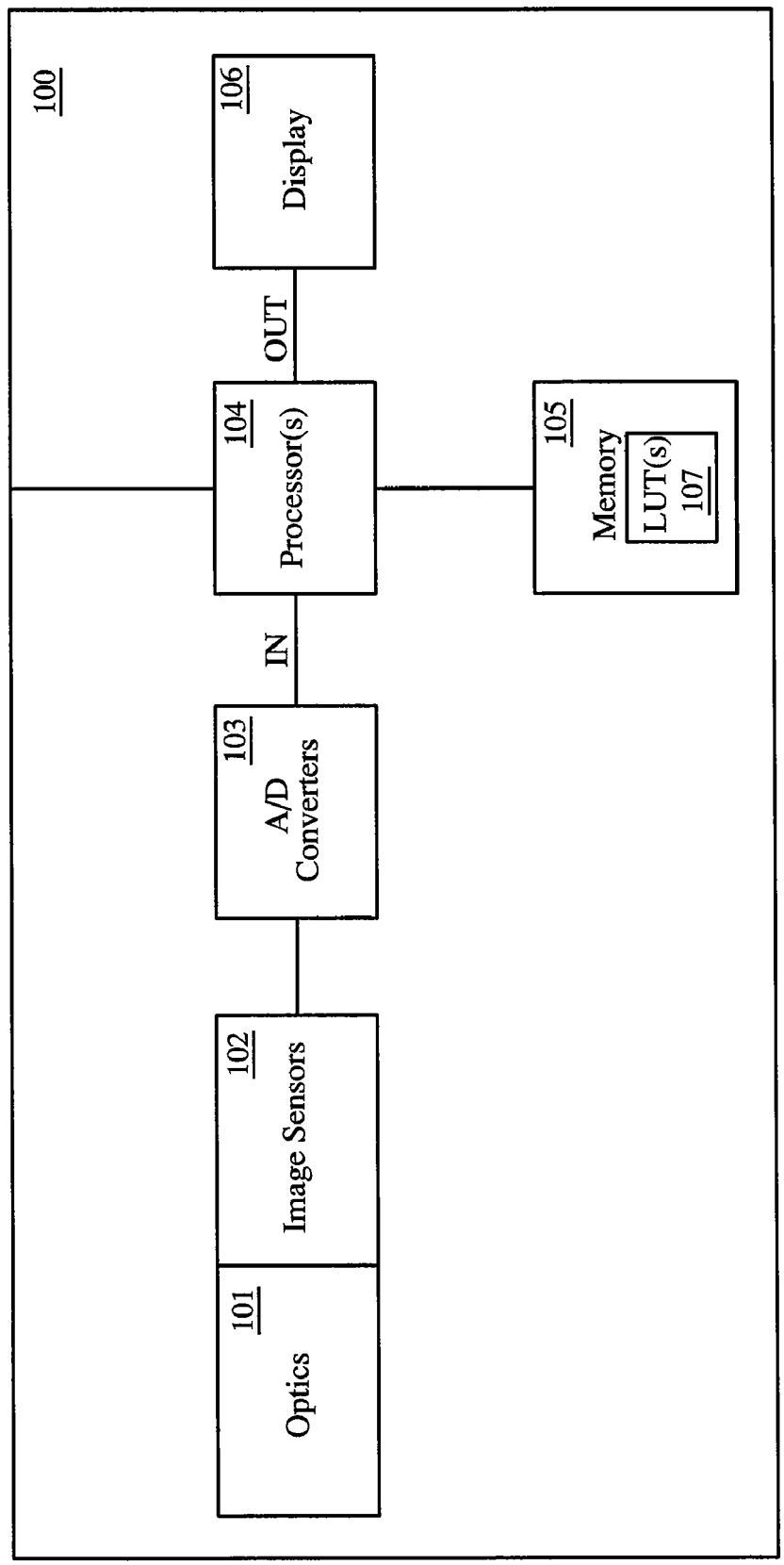
FIG. 1 shows a block diagram of an embodiment of an exemplary operating environment for an embodiment of the invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal.

Briefly stated, the invention is related to a device for noise reduction that includes a noise reduction unit and a noise reduction three-dimensional look-up table (LUT). The noise reduction LUT transforms an input image into a noise reduction factor and noise reduction threshold for each pixel of the input image. The noise reduction unit performs noise reduction on the input image based on the noise reduction characteristics determined from the noise reduction LUT.

FIG. 1 shows a block diagram of an embodiment of an exemplary operating environment (100) for an embodiment of the invention. In one embodiment, operating environment 100 may be a digital camera or the like. In other embodiment, operating environment 100 can be essentially any kind of device that can acquire, generate, process or produce image data, such as a digital camera, computer, printer or display device. Operating environment 100 includes a set of optics (e.g., one or more lenses and/or light guides) 101, a set of image sensors 102 optically coupled to the optics 101, a set of analog-to-digital (A/D) converters 103 having inputs electrically coupled to outputs of the image sensors 102, and one or more processors 104 coupled to receive the outputs of the A/D converters 103. The image sensors 102 may produce separate R, G and B color signals. The camera 100 further includes a display device 106 coupled to outputs of the processor(s) 104, and a memory having bi-directional communication with the processor(s) 104.

In operation, the image sensors 102 receive input light through the optics 101 and, in response, produce analog output color signals R, G and B to the A/D converters. The A/D converters convert those input color signals to digital form, which are provided to the processor(s) 104.

In one embodiment, image sensors 102 are CMOS sensors. In other embodiments, they be CMOS sensors, or another other image capturing device.

The processor(s) 104 may perform any of various well-known types of processing on those input color signals. The processor(s) 104 also may perform color matching and/or other types of signal transformation. The processor(s) 104 may be or include, for example, any one or more of: a programmed microprocessor or digital signal processor (DSP), a microcontroller, an application specific integrated circuit (ASIC), a programmable logic device (PLD), etc.

The memory 105 may be or include, for example, anyone or more of: flash memory, read-only memory, random access memory (RAM), etc. Memory 105 may be used to store look-up table(s) (LUT(s)) 107.

Processed or raw color data can be output to the display device 106 for display and/or to one or more external devices, such as a computer or printer.

Figure 2:
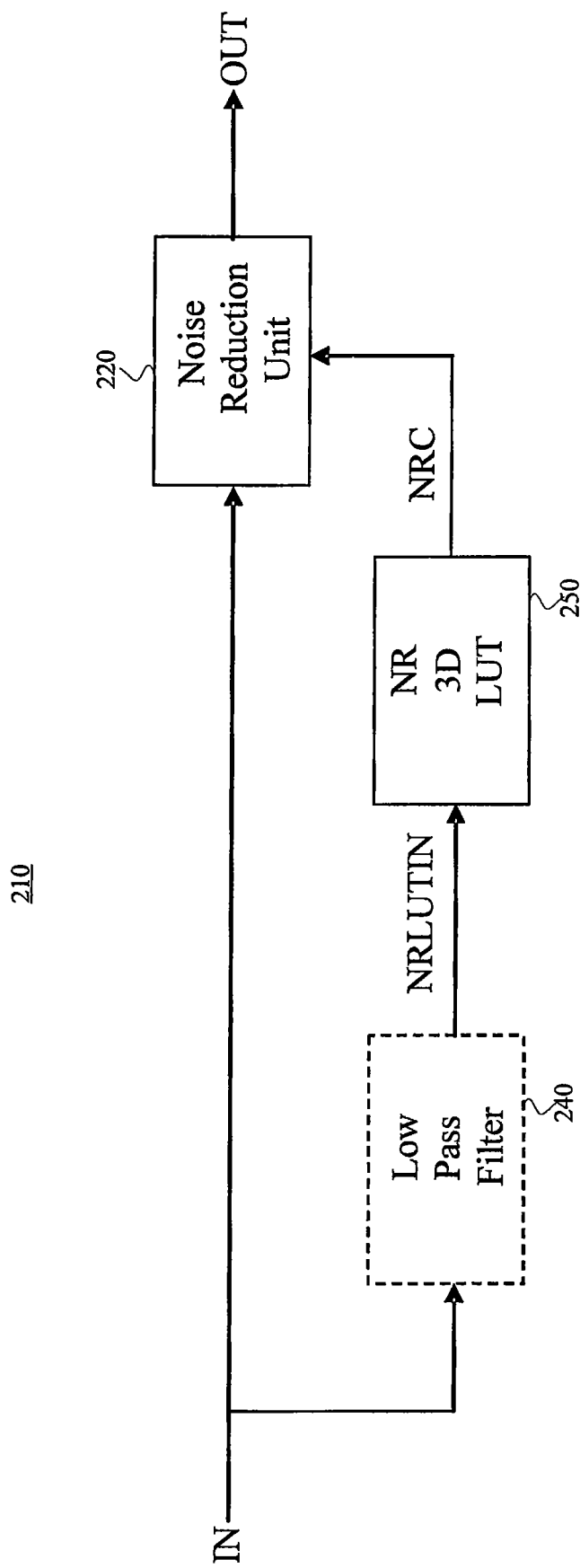
FIG. 2 illustrates a block diagram of an embodiment of a device.

FIG. 2 illustrates a block diagram of an embodiment of device 210, which may be employed for noise reduction of input image IN to provide an output image OUT. Device 210 includes noise reduction (NR) unit 220, noise reduction 3D LUT 250, and may optionally further includes low-pass filter 240.

In some embodiments, low-pass filter 240 is arranged to perform low-pass filtering on input image IN to provide noise-reduction lookup input image NRLUTIN. The low-pass filtering causes each pixel image NRLUTIN to be based on the average of pixel values in a local neighborhood around the current pixel.

In other embodiments, image NRLUTIN is input image IN.

Noise reduction (NR) 3D LUT 250 is arranged to transform image NRLUTIN into noise reduction components. In one embodiment, Noise reduction (NR) 3D LUT 250 is arranged to transform image NRLUTIN into, for each color component of each pixel, at least one noise reduction component. In other embodiments, NR 3D LUT 250 may hold a single parameter set for all colors components, or alternatively, it may hold two parameter sets (for example, in case of YUV color space—one parameter set for Y component and another for UV components).

Figure 3:
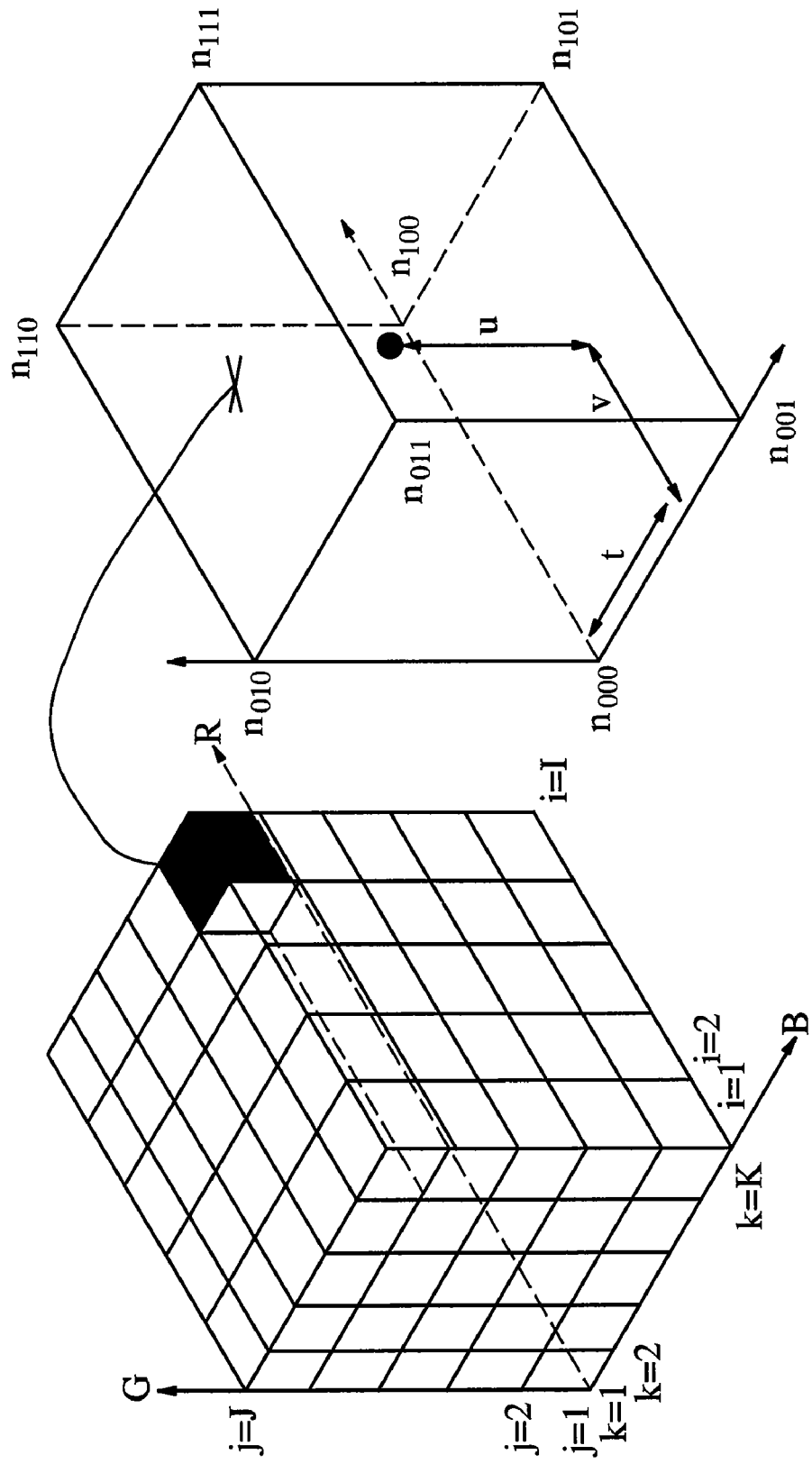
FIG. 3 shows a three-dimensional lookup table.

The noise reduction component values NRC generated for each pixel of image NRLUTIN is provided to noise reduction unit 220. FIG. 3 illustrates one example of a 3D LUT. In one embodiment, the noise reduction components NRC are noise reduction factors and/or thresholds. In another embodiment, rather than noise reduction factors and/or thresholds, noise reduction components NRC are the index of the kernel used by the noise reduction filter. In one embodiment, for each pixel, a noise reduction factor and noise reduction threshold is output for each color component of each pixel in image NRLUTIN, yielding 6 values for each pixel. For example, if input image IN is an RGB image, the color components are R (red), G (green), and B (blue). If input image IN is a YUV image, the color components are Y, U, and V. In other embodiments, other three-dimensional color spaces may also be employed.

Noise reduction unit 220 is arranged to perform noise reduction on input image IN to generate output image OUT, using noise reduction components NRC so that the noise reduction behavior/characteristics (such as noise reduction aggressive and/or other noise reduction characteristics) performed at each pixel is based on the color of that pixel. Accordingly, each pixel is treated separately based on a color of the pixel in image NRLUTIN. The color of the pixel in image NRLUTIN is not necessarily the same as the corresponding pixel in image IN, due to presence of, e.g., low-pas filter 240 and/or any other operations done to generate image NRLUTIN from image IN.

In some embodiments, rather then holding all possible pixel values, NR 3D LUT 250 may be down-scaled, so that the resulting output is based on interpolation if the exact input pixel value is does not have an output in the table. For example, linear interpolation, polynomial interpolation, or hybrid linear-polynomial interpolation may be employed. The interpolation is based on two or more values relatively nearby the input values. For example, the interpolation may use an interpolation using four nodes (tetrahedron), six nodes (prism), or eight nodes (cube).

Further, NR 3D LUT 250 may be created in different ways in different embodiments. In some embodiments, determinations of what strength of noise reduction should be assigned to each given color are left up to the customer. Noise levels in an image are often dependent on the colors of the pixels in the captured digital image. Some colors may be noisier than others and therefore require different treatment by NR unit 220. Moreover, even if the noise levels in the image do not depend on the colors, or at least not directly, it may still be desirable to change the strength of the NR operation with respect to each color in order to produce a more pleasing result. For example, the blue color is mostly related to the sky. Being flat by nature, a customer may prefer to use a stronger NR operation for the color blue to produce an eye-pleasing result. On the other hand, the color green is mostly related to trees and grass and contain many details by nature. Therefore, a customer may prefer to use a softer NR operation for the color green. In other embodiments, the customer may prefer to assign NR strength to colors based on different criteria than this. These embodiments and others are within the scope and spirit of the invention.

There are many different noise reduction algorithms that may be performed by noise reduction unit 240. The following is one example noise reduction algorithm; however, the example is one embodiment provided by way of example only, and other noise reduction algorithms are within the scope and spirit of the invention.

In the following explanation of one particular embodiment of a noise reduction algorithm, Pin(x,y) represents the signal of one color component of a pixel prior to undergoing a noise reduction process. A blending factor, $\alpha$, is calculated, and the noise reduction filter operates as a whole, as shown in the pseudo-code example below for one particular embodiment. In this embodiment, the manufacturer can determine the constants "A" as a calibration step. The Threshold T and "Factor" are both provided by NR 3D LUT 250 in one embodiment.

"T" is a threshold that indicates the noise levels of the camera's sensor and changes according to the ISO sensitivity and differing exposure settings (shutter speed and lens aperture size combination) settings.

"A" is a threshold that is used to detect whether or not the current region of the image is flat and uniform, or whether it contains edges and details that should be preserved. It can arbitrarily selected to be approximately, say, 0.75. If the variable "count" in the example below is above this threshold, the current region is deemed to be sufficiently uniform and flat to allow noise reduction to occur; otherwise, noise reduction is disabled in order to preserve detail.

In flat areas, "Factor" determines the weight of the center pixel in the final output (the output pixel is produced by a weighted average of the center pixel and the average of all pixels in its neighborhood). In other words, this parameter controls the aggressiveness of the noise reduction filter by determining how much of the noise will be removed, and how much of the noise will be maintained in the final result. For example, by setting Factor=0.3, the noise level after the NR filter will be 30% of the noise level before the NR filter. If Factor=0 then the noise will be removed almost completely; however textures and fine details which are below the noise level (indicated by threshold 'T') will be eliminated as well. On the other hand, if Factor=1, then all textures and details will be preserved, however the noise will not be reduced at all. In other words, Factor controls the trade-off between preserving fine details and removing noise.

In one embodiment, noise reduction unit 220 operates on an environment of N×N pixels around the current pixel, where N is an odd number. According to this particular embodiment, for each input image pixel in (x,y) coordinates, Pin[x,y], perform

```
{
    Sum[x,y] = 0
    Count[x,y] = 0
    for (m=-(N-1)/2; m<=(N-1)/2;m++)
    {
        for (n=-(N-1)/2; n<=(N-I)/2;n++)
        {
            Sum[x,y] = Sum[x,y] +Pin[x+n,y+m]
            if(abs(Pin[x,y]-Pin[x+n,y+m])<T)
            {
```

```
            Count[x,y]=Count[x,y]+1
        }
    }
}
    Average[x,y] = Sum[x,y]/(N2)
    Flatness [x,y] = Count[x,y]/(N2)
    If (Flatness[x,y]<A)
        Flatness[x,y]=0
    Else
        Flatness[x,y]=(Flatness[x,y]-A)/(1-A)
    Alpha[x,y] = Flatness[x,y]*(1 -Factor)
    Pnr[x,y] = Alpha[x,y]*Average[x,y] + (1-Alpha[x,y])*Pin[x,y]
}
```

This process is performed on each color component separately, so that for RGB, the process is performed on separately for R, G, and B; when performed for R, Pin[x,y] is the R value of the pixel, and so forth.

In the pseudo-code of this example, the variable Sum[x,y] is the total of the values of all the pixels in the calculation neighborhood. Thus when it is divided by $N^2$, it is the average of all the pixels in the region. The variable Count[x,y] is the total number of occurrences in the region when the difference between the current pixel and one of its neighbors is below the threshold of noise, T. When divided by $N^2$, it becomes a variable between 0 and 1, called Flatness[x,y], that indicates the relative uniformity or flatness of the region. If this variable is below the threshold A, no noise reduction is performed in order to preserve detail. If Flatness[x,y] is above the threshold A, it is used to calculate the blending variable a, Alpha[x,y], such that the more uniform the region, the more blending that is allowed. Finally the noise reduced pixel data is calculated by blending the current pixel with the average of its neighbors using Alpha[x,y], as indicated.

In regions containing edges and fine detail, Flatness [x,y] will tend to 0 and therefore the exemplary filter actually performs little or nothing:

Pnr[x,y]=Pin[x,y]

This means that the filter will avoid averaging the current pixel with the neighboring pixels, thereby preserving the edges and detail.

In areas of great uniformity, Flatness [x,y] will tend to 1 and therefore the filter actually performs:

Pnr[x,y]=(1-Factor)*Average[x,y]+Factor*Pin[x,y]. This means that the filter will perform a weighted average of the current pixel with the neighboring pixels in order to remove noise.

Assuming that N is big enough so that the noise variance on Average[x,y] is very close to 0, and assuming the noise variance of the noise on Pin[x,y] is σ, then the noise variance of Pnr[x,y], $\sigma_{nr}$, will be:

$\sigma_{nr}$=Factor*σ

This means that the noise levels on the output image will controllable by changing the parameter Factor.

As discussed above, in one embodiment, the factor ("Factor") and threshold (T) of each color component of each pixel is determined by the output of NR 3D LUT, so that the aggressiveness of noise reduction of each color component of each pixel is determined separately based on the value of that pixel. In typical embodiment, the threshold A is constant and is not determined from NR 3D LUT 250.

Although one particular embodiment of noise reduction is discussed above by way of example, the invention is not so limited, and embodiments of the invention include virtually any type of noise reduction algorithm in which it is possible to modify the noise reduction behavior/characteristics, and NRC is one or more parameters adjustable to modify the noise reduction behavior/characteristics. For example, although NRC consisting of the factor and threshold is used in one embodiment, in other embodiments, noise reduction components NRC are the index of the kernel used by the noise reduction filter.

Figure 4:
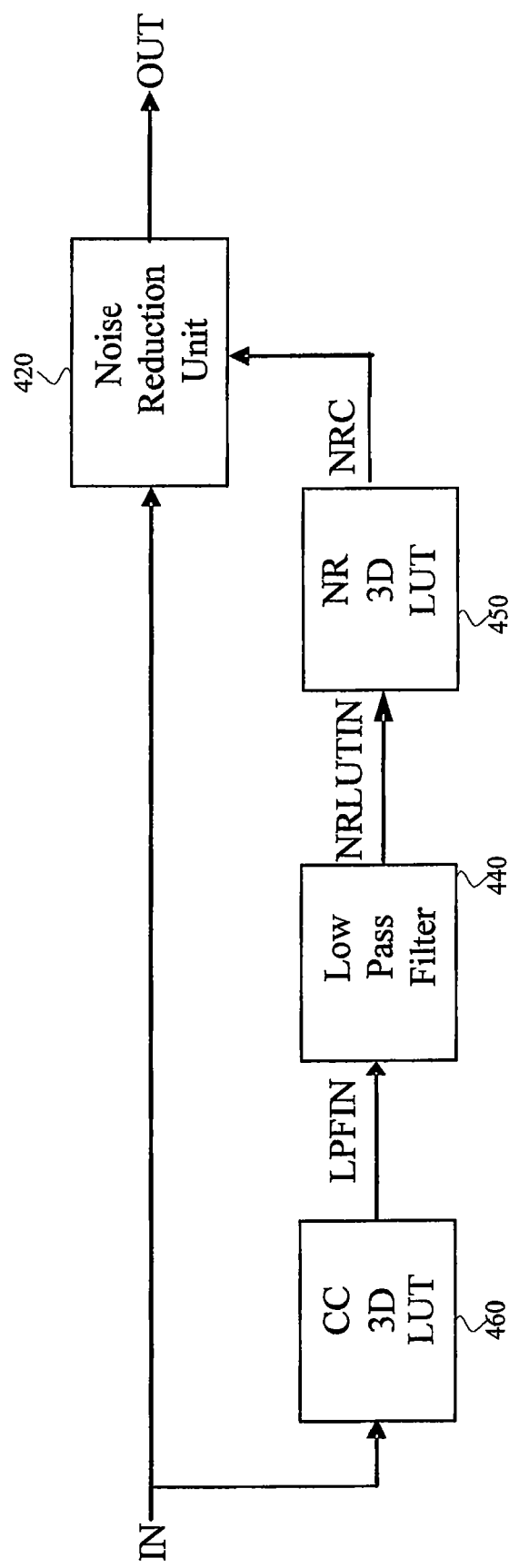
FIG. 4 illustrates a block diagram of an embodiment of the device of FIG. 2, arranged in accordance with aspects of the present invention.

FIG. 4 illustrates a block diagram of an embodiment of device 400, which may be employed as an embodiment of device 210 of FIG. 2. Device 400 further includes color correction (CC) 3D LUT 460.

In various embodiments of device 210 of FIG. 2, NR unit 220 can be located anywhere in the camera signal processing pipe. However, for embodiments in which NR unit 220 is located before other units that may shift colors, noise reduction components NRC correspond to the temporary colors in the place where NR unit 220 is located instead of the final output colors of the camera. To solve this problem, in some embodiments of device 400, CC 3D LUT 460 is added. In an embodiment of the use of a two-path 3D LUT the same LUT hardware may be used for both passes (i.e. for both NR 3D LUT 450 and CC 3D LUT 460).

CC 3D LUT 460 is arranged to provide low-pass input image LPFIN from input image IN. Low pass filter 440 is arranged to provide noise-reduction lookup image NRLUTIN from low-pass input image LPFIN.

Further, CC 3D LUT 460 is arranged to perform a color space transformation on input image IN to generate low-pass filter input image IN so that image LPFIN is color-corrected relative to input image IN.

There are several different embodiments of color space transformation that may be performed. Consider first a color space transformation that uses conventional linear interpolation, based on a LUT. The size of a LUT grid $N_g$ required to map all possible colors from a single input pixel to a single output pixel is $N_g = D_{out} Q_{in}^{D_{in}}$, where D is the dimensionality of the color signal, which should be set to 3 for RGB input and RGB output; and $Q_{in}$ is the signal quantization level, which should be set, for example, to 4096, that is 12 bits, for Charge Coupled Device (CCD) digital image sensors. In this example, the number of color possibilities for each pixel in the image grid would be 206, 158, 430, 208. This huge number comes from the fact that each pixel can display $D \cdot Q^D$=~206, 158, 430, 208 different colors, when Q=4096 and D=3, as in the above case. Note that this large number is not related to image grid size, only to the number of color variations possible for each pixel in the image grid. In view of this, it can be seen that there is a need to approach the use of a LUT in a careful, creative way, or the approach will not be practical.

A common solution to the use of LUTs is to employ a sub-sampled color grid of size $N_g = D_{out} \tilde{Q}^{D_{in}}$, where in common practice $\tilde{Q}$ lies between 17 and 33. The quality of the color mapping in this instance is dependent on the color grid location, the chosen grid values, and the interpolation algorithm used to evaluate the missing color samples. In terms of mapping quality, the minimum practical grid size mentioned for $\tilde{Q}$ in the literature, for the case of RGB to CMYK mapping, is 10.

The standard color mapping solution from the International Color Consortium (ICC) standards setting body is the use of a uniform color grid. Known solutions commonly perform an interpolation algorithm using a four-(tetrahedron), six-(Prism) or eight-(cube) node construct. Each primary output color is individually found from separately interpolated primary LUT colors, where the interpolation is linear (a first order polynomial). The quality of the interpolation is evaluated in terms of interpolation error and smoothness of the mappings in nearby LUT color grid nodes. Lack of smoothness is due to small grid size or a rapidly changing mapping function, and can be visually noticed as a contour artifact in uniform regions of the photo.

It is currently believed that the tetrahedron approach gives the lowest interpolation error, since the tetrahedron is the smallest volume unit. As such, the distance from the input value to the values at the four vertices of the tetrahedron must be shorter than the inputs value's distance to the values at all six or eight vertices of the prism or cube. Thus, the interpolation error is smaller. Although examination of contour artifacts have not been compared for the three interpolation choices, the tetrahedron is chosen for the following conventional interpolation process description, which, beside the low error, requires only four memory calls per pixel.

A cube can be divided into 24 different tetrahedrons but to only 5 or 6 non-overlapping tetrahedrons. A cube is divided into six tetrahedrons for this example, because this segmentation provides the smallest unit volume, and because all six tetrahedrons have two common vertices.

In one embodiment, each pixel is represented as a 3-dimensional (3D) tuplet of input RGB values. The LUT can be represented as a cube, which contains a number of smaller cubes, the vertices of which are the entries, or "nodes", n of the LUT. Each node n contains the three output rgb value tuplet, p. If CYMK is used, each node n contains the four outputp values.

In this approach, the cube is divided into a pair of separable prisms. In one example, prism1 is divided into three tetrahedrons, tetahedron1, tetahedron2 and tetahedron3, and prism2 is divided in the same manner into tetahedron4, tetahedron5 and tetahedron6. The conditions in Table 1 can be used to find the correct tetrahedron into which to locate the input pixel.

TABLE 1

Tetrahedron Identification

| Tetrahedron | Conditions | | |
|---|---|---|---|
| 1 | t > u | | t < u |
| 2 | | t ≧ v | v < u |
| 3 | | | v ≧ u |
| 4 | t ≦ u | | t > u |
| 5 | | t ≦ v | v < u |
| 6 | | | v ≧ u |

In Table 1, the values v, u and t represent the normalized input signal colors, red (R), green (G) and blue (B), respectively, inside the relevant sub-cube (see definition below).

Next, the conventional linear interpolation algorithm will be mathematically formulated. Note that the linear interpolation algorithm is not the same type of "interpolation" as the tetrahedral interpolation referred to above and below. Tetrahedral interpolation is used to describe that the output signal is interpolated using exactly four (4) entries of LUT rgb tuplet. The linear interpolation algorithm, on the other hand, can be used to implement the tetrahedral interpolation by using the four entries of the tetrahedral to separately evaluate the contribution of the R, G and B to the final output color signal.

Assume the following:
Input signal is (R, G, B) (e.g., a camera sensor RGB color space);
Output signal is (r, g, b) (e.g., the sRGB (display) color space);
Input signal size is $S=2^{12}$ bits;

Output red channel LUT is $L_r(i,j,k)$ of grid size of $I_r \times J_r \times K_r$ entries;
Output green channel LUT is $L_g(i,j,k)$ of grid size of $I_g \times J_g \times K_g$ entries;
Output blue channel LUT is $L_b(i,j,k)$ of grid size of $I_b \times J_b \times K_b$ entries; and $n_{000} = (i,j,k)$ denotes the coordinates value of the LUT inner cube where $$i = \left[\frac{R}{T_R}\right],$$

$$T_R = \frac{S}{I-1} = 2^{12-n},$$

$$j = \left[\frac{G}{T_G}\right],$$

$$T_G = \frac{S}{J-1} \text{ and}$$

$$k = \left[\frac{B}{T_B}\right],$$

$$T_B = \frac{S}{K-1}$$

The value $P_{000}$ denotes the stored content in $n_{000}$ coordinates in the LUT. The value $P_{id}$ is the LUT contents where id is the cubic vertex coordinates. The value $P_{id}$ holds 3 parameters: $P_{r,id}$, $P_{g,id}$ and $P_{b,id}$, that hold the output signal value of the red, green and blue channels, respectively.

$$\tilde{v} = R - i \cdot T_R,$$

$$v = \frac{\tilde{v}}{T_R}$$

$$\tilde{u} = G - j \cdot T_G,$$

$$u = \frac{\tilde{u}}{T_G}$$

$$\tilde{t} = B - k \cdot T_B,$$

$$t = \frac{\tilde{t}}{T_B}$$

An example of a process for performing color space transformation using linear-interpolation, with tetrahedral interpolation to determine the LUT output values, proceeds as follow. Initially, the process finds the cube within the LUT that holds the output signal (which is the cube that contains the input signal). Next, the process finds the tetrahedral within that cube that holds the output signal. The tetrahedral can be located by using Table 1, above. Next, the process extracts the tetrahedron's (LUT) vertex coordinates. The vertex coordinates may be determined from Table 2, below. Finally, the process performs linear interpolation using equations (1a), (1b) and (1c), respectively, to determine the final output signal values. The standard linear interpolation for the case where the LUT contains constant values is given by:

$$r = P_{r,000} + \Delta_{r,t} + \Delta_{r,u} + \Delta_{r,v} = P_{r0000} + s_{r,t} \cdot t + s_{r,u} \cdot u + s_{r,v} \cdot v \quad (1a)$$

$$g = P_{g,000} + \Delta_{g,t} + \Delta_{g,u} + \Delta_{g,v} = P_{g0000} + s_{g,t} \cdot t + s_{g,u} \cdot u + s_{g,v} \cdot v \quad (1b)$$

$$b = P_{b,000} + \Delta_{b,t} + \Delta_{b,u} + \Delta_{b,v} = P_{b0000} + s_{b,t} \cdot t + s_{b,u} \cdot u + s_{b,v} \cdot v \quad (1c)$$

where output signal values $P_{r,000}$, $P_{g,000}$ and $P_{b,000}$ are the red, green and blue values, respectively, extracted from the LUT grid. The values $\Delta_t$, $\Delta_u$ and $\Delta_v$ are the additional signal values of the blue, green and red channels, respectively. The values $s_t$, $s_u$, $s_v$ are given by $$s_{r,t}=P_{r,id2_{(t)}}-P_{r,id1_{(t)}}, s_{r,u}=P_{r,id2_{(u)}}-P_{r,id1_{(u)}}, s_{r,v}=P_{r,id2_{(v)}}-P_{r,id1_{(v)}}$$

$$s_{g,t}=P_{g,id2_{(t)}}-P_{g,id1_{(t)}}, s_{g,u}=P_{g,id2_{(u)}}-P_{g,id1_{(u)}}, s_{g,v}=P_{g,id2_{(v)}}-P_{g,id1_{(v)}}$$

$$s_{b,t}=P_{b,id2_{(t)}}-P_{b,id1_{(t)}}, s_{b,u}=P_{b,id2_{(u)}}-P_{b,id1_{(u)}}, s_{b,v}=P_{b,id2_{(v)}}-P_{b,id1_{(v)}} \qquad (2)$$

TABLE 2

| | Tetrahedron vertex coordinates | | | | | |
|---|---|---|---|---|---|---|
| | Blue | | Green | | Red Channel | |
| Tetrahedron | $id2_{(t)}$ | $id1_{(t)}$ | $id2_{(u)}$ | $id1_{(u)}$ | $id2_{(v)}$ | $id1_{(v)}$ |
| 1 | 101 | 100 | 111 | 101 | 100 | 000 |
| 2 | 001 | 000 | 011 | 001 | 111 | 011 |
| 3 | 001 | 000 | 111 | 101 | 101 | 001 |
| 4 | 011 | 010 | 010 | 000 | 111 | 011 |
| 5 | 111 | 110 | 010 | 000 | 110 | 010 |
| 6 | 111 | 110 | 110 | 100 | 100 | 000 |

LUT of Functions/Hybrid Polynomial Interpolation

With the above description providing context, consider now a different form of LUT based technique, specifically, one in which a transformation LUT contains mathematical functions (e.g., interpolation functions), rather than just output signal samples. This approach facilitates implementation of special interpolation algorithms.

To simplify explanation, first consider a one-dimensional (1D) LUT mapping. In one example of a 1D LUT, the input signal, x, is the index to the output signal, y. When transforming colors from 3D input RGB to 3D output rgb, for example, x represents R, G or B, and y represents r, g or b. The ith LUT entry $n_i$ stores a function $f_{i+1}(X)$, which can be an interpolation function. A different function can be stored in each LUT entry.

In practice, each LUT entry stores sufficient information to uniquely and completely define a function, such as information identifying the type of function and one or more parameters of the function. For example, the type of function can be polynomial, trigonometric (e.g., cosine), or statistical (e.g., Gaussian Mixture Model (GMM)), where the corresponding parameters can be: polynomial order and coefficients (for a polynomial type function); amplitude, angle and offset (for a cosine type function); means and standard deviations (for a statistical type function).

When implementing a tetrahedral LUT, each output channel (r, g or b) is actually a separable combination of f(R), f(G) and f(B). Hence, in the more-realistic case of a 3D LUT corresponding to RGB-to-rgb transformation, each 3D LUT entry can hold the following information, where $\Gamma_{x,y}$ represents the influence, as a second-order polynomial, of the x color input on the y color output, where x can be any of the input color components (e.g., R, G or B) and y can be any of the output color components (e.g., r, g or b):

Information to be used to formulate $\Gamma_{r,t}$:
function type for r output as function of R input
function parameters for r output as function of R input
Information to be used to formulate $\Gamma_{r,u}$:
function type for r output as function of G input
function parameters for r output as function of G input
Information to be used to formulate $\Gamma_{r,v}$:
function type for r output as function of B input
function parameters for r output as function of B input
Information to be used to formulate $\Gamma_{g,t}$:
function type for g output as function of R input
function parameters for g output as function of R input
Information to be used to formulate $\Gamma_{g,u}$:
function type for g output as function of G input
function parameters for g output as function of G input
Information to be used to formulate $\Gamma_{g,v}$:
function type for g output as function of B input
function parameters for g output as function of B input
Information to be used to formulate $\Gamma_{b,t}$:
function type for b output as function of R input
function parameters for b output as function of R input
Information to be used to formulate $\Gamma_{b,u}$:
function type for b output as function of G input
function parameters for b output as function of G input
Information to be used to formulate $\Gamma_{b,v}$:
function type for b output as function of B input
function parameters for b output as function of B input Let $\vec{P}(i)$ be a vector of parameters $P_1(i), \ldots, P_N(i)$ stored in the ith LUT entry, where $f_{i+1}()$ is an interpolation function associated with parameters $\vec{P}(i), \vec{P}(i+1)$, and the input signal is located between the ith and (i+1)th LUT entries. Recall that $P_{000}$ denotes the stored content in coordinates $n_{000}$ of the LUT and that $P_{id}$ is the LUT contents, where id is the tetrahedral vertex coordinates. Hence, in one embodiment, the contents $P_{id}$ of each LUT entry include the following six parameters (two for each of the three color components, assuming RGB):

values $P_{r,id}$, $P_{g,id}$ and $P_{b,id}$ which are the output signal values of red, green and blue channels, respectively; and derivatives $$P_{dr,id} = \left(\frac{dr}{dR}\right)_{id},$$

$$P_{dg,id} = \left(\frac{dg}{dG}\right)_{id},$$

$$P_{db,id} = \left(\frac{db}{dB}\right)_{id},$$

which are the slopes of the red, green and blue outputs, respectively.

The interpolation function coefficients can be calculated from the value and slope of two successive LUT entries. In practice, the derivative values need not be directly stored in every LUT entry. Instead, the derivatives can be quantized and represented by an index number in the LUT. In that case the derivatives values can be acquired directly from an additional 1D LUT by using the index number.

To permit the use of a smaller LUT (i.e., less memory), a second-order polynomial interpolation can be implemented in the direction of the most-influencing color, such that the output signal is an estimation of one polynomial (second-order) interpolation and two linear interpolations (i.e., a "hybrid polynomial interpolation") as follows.

$$r=P_{r000}+\Delta_{r,t}+\Delta_{r,u}+\Gamma_{r,v}=P_{r000}+s_{r,t}\cdot t+s_{r,u}\cdot u+\Gamma_{r,v}\cdot v \qquad (3a)$$

$$g=P_{g000}+\Delta_{g,t}+\Gamma_{g,v}+\Delta g,v=P_{g000}+s_{g,t}\cdot t+\Gamma_{g,u}\cdot u+s_{g,v}\cdot v \qquad (3b)$$

$$b=P_{b000}+\Gamma_{b,t}+\Delta_{b,u}+\Delta_{b,v}=P_{b000}+\Gamma_{b,t}\cdot t+s_{b,u}\cdot u+s_{b,v}\cdot v \qquad (3c)$$

where the second-order polynomial interpolation part is given by $$\Gamma_{r,v} = v\cdot\left(\left(\frac{P_{dr,id1_{(v)}} - P_{dr,id2_{(v)}}}{2}\right)\cdot(n_{id2_{(v)}} - R) + P_{r,id2_{(v)}} - P_{r,id1_{(v)}}\right) \qquad (4a)$$

-continued $$\Gamma_{g,u} = u \cdot \left( \left( \frac{P_{dg,id1_{(u)}} - P_{dg,id2_{(u)}}}{2} \right) \cdot \left( n_{id2_{(u)}} - G \right) + P_{g,id2_{(u)}} - P_{g,id1_{(u)}} \right) \quad (4b)$$

$$\Gamma_{b,t} = t \cdot \left( \left( \frac{P_{db,id1_{(t)}} - P_{db,id2_{(t)}}}{2} \right) \cdot \left( n_{id2_{(t)}} - B \right) + P_{b,id2_{(t)}} - P_{b,id1_{(t)}} \right) \quad (4c)$$

and the linear interpolation part can be estimated from equation system (2).

In equations (3a), (3b) and (3c), $\Delta_{y,x}$ represents the influence, as a first-order polynomial, of the x color input on the y color output, while $\Gamma_{y,x}$ represents the influence, as a second-order polynomial, of the x color input on the y color output, where x can be any of the input color components (e.g., R, G or B) and y can be any of the output color components (e.g., r, g or b).

This hybrid polynomial interpolation approach is based on the assumption that: the r output depends mostly on the R input and less on G and B; the g output depends mostly on the G input and less on R and B; and the b output depends mostly on the B input and less on the R and G. In other words, R is the "most-influencing" color channel for the r output; G is the "most-influencing" color channel for the g output; and B is the "most-influencing" color channel for the b output. Consequently, $\Gamma_{r,u}$ and $\gamma_{r,t}$ can be less complex than $\Gamma_{r,v}$. In particular, $\Gamma_{r,u}$ and $\Gamma_{r,t}$ can be first-order polynomials whereas $\Gamma_{r,v}$ can be a second-order polynomial, and so forth for the other output color components. The first-order polynomial can be the common linear interpolation which can be implemented by storing the output signal values in the LUT, whereas the second-order polynomial can be implemented by storing the output signal and first-order derivative (slope) in the LUT.

Note that in other embodiments, a LUT entry might store a polynomial of order higher than second-order, or a derivative thereof. For example, the size of the LUT grid can be reduced even further by storing in $\Gamma_{r,u}$ and $\Gamma_{r,t}$ second-order polynomials while storing in $\Gamma_{r,v}$ third-order polynomial, and so forth.

Thus, in one embodiment, for each particular evaluation of any of equations (3) or (4), if the computation is being done for the most-influencing color channel, then both the output value $P_r$ and the derivative value $p_{dr}$ are used from the LUT; whereas if the computation is being done for a color channel other than the most-influencing color channel, then only the output value $P_r$ is used from the LUT in the computation.

Note that the interpolation embodied in equations (3a), (3b) and (3c) is not the same type of "interpolation" as the tetrahedral interpolation referred to above and below. As already noted, tetrahedral interpolation is used to describe that the output signal is interpolated using exactly four (4) entries of LUT rgb tuplet. The hybrid polynomial interpolation of equations (3a), (3b) and (3c), on the other hand, can be used to implement the tetrahedral interpolation by using the four entries of the tetrahedral to separately evaluate the contribution of the R, G and B to the final output color signal.

Another approach is using the hybrid polynomial based on LUT approach, using tetrahedral interpolation to determine the LUT output values. It can be seen that the process is essentially the same the linear-interpolation with tetrahedrons method discussed above, except that in the final operation, hybrid polynomial interpolation is performed on the LUT outputs according to equations (3a), (3b) and (3c) to generate the final output signal values, rather than linear interpolation according to equations (1a), (1b) and (1c).

The following discussion explains how $\Gamma_v$ can be formulated. Recall that $\Gamma_v$ is the interpolation function. Theoretically, the third-order polynomial interpolation can be implemented using a LUT with R,G,B triple output values and three slopes.

Practically, a second-order polynomial can be estimated instead, since its imlemention requires only a single multiplication operator.

First, $\Gamma_1$ and $\Gamma_2$ are found, and then the weighted $\Gamma_v$ is evaluated using the following equation, $$\Gamma_v = (1-v) \cdot \Gamma_1(R-n_1) + v \cdot \Gamma_2(R-n_1), \quad (5)$$

where $$v = \frac{R-n_1}{n_2-n_1} = \frac{R-n_1}{T_R}$$

and $n_1$, $n_2$ are successive input values corresponding to successive pairs of LUT entries. Theoretically the two polynomials should be identical, but practically they are not, since the slope values are quantized in the LUT for the purpose of achieving a smaller memory size.

Next, we find the relationship between the polymomial coefficients $a, b, p_1$ and the slopes $$dp_1 = \frac{dr}{d(R-n_1)}\bigg|_{(R-n_1)=1},$$

$$dp_2 = \frac{dr}{d(R-n_1)}\bigg|_{(R-n_1)=T_R}$$

of $\Gamma_1(R-n_1) = r - p_1 = a \cdot (R-n_1)^2 + b \cdot (R-n_1)$ polynomial.

$$\frac{dr}{d(R-n_1)} = 2 \cdot (R-n_1) + b, \quad (6)$$

$$dp_1 = b \text{ and}$$

$$dp_2 = 2 \cdot a \cdot T_R + dp_1$$

yields $\begin{cases} b = dp_1 \\ a = \dfrac{dp_2 - dp_1}{2T_R} \end{cases}$ $$\Gamma_1 = \frac{dp_2 - dp_1}{2T_R} \cdot (R-n_1)^2 + dp_1 \cdot (R-n_1)$$

$$= T_R \cdot \left( \frac{dp_2 - dp_1}{2} \cdot v^2 + dp_2 \cdot v \right),$$

$$\Gamma_1 = T_R \cdot \left( \frac{dp_2 - dp_1}{2} \cdot v^2 + dp_1 \cdot v \right)$$

Next, $\Gamma_2$ is evaluated. First $\Gamma_2$ is found as function of $1-v$ with the opposite x-axis.

$$\begin{cases} b = dp_2 \\ a = \dfrac{dp_1 - dp_2}{2T_R} \end{cases} \quad (7)$$

$$r - p_2 = T_R \cdot \left[ \frac{dp_2 - dp_1}{2} \cdot (1-v)^2 - dp_2 \cdot (1-v) \right]$$

yields

-continued $$\Gamma_2 = r - p_1$$
$$= p_2 - p_1 + T_R \cdot \left[ \frac{dp_2 - dp_1}{2} \cdot (1-v)^2 - dp_2 \cdot (1-v) \right]$$

Putting equations (6) and (7) into equation (5), we have:

$$\Gamma_v = (1-v) \cdot T_R \cdot \left\{ \frac{dp_2 - dp_1}{2} \cdot v^2 + dp_1 \cdot v \right\} + v \cdot$$
$$\left\{ p_2 - p_1 + T_R \cdot \left[ \frac{dp_2 - dp_1}{2} \cdot (1-v)^2 - dp_2 \cdot (1-v) \right] \right\}$$
$$= (1-v) \cdot T_R \cdot \left\{ \frac{dp_2 - dp_1}{2} \cdot (v - v^2 + v^2) + dp_1 \cdot v - dp_2 \cdot v \right\} +$$
$$v \cdot (p_2 - p_1)$$
$$= v \cdot \left\{ (1-v) \cdot T_R \cdot \frac{dp_1 - dp_2}{2} + p_2 - p_1 \right\}$$
$$= v \cdot \left\{ (n_2 - R) \cdot \frac{dp_1 - dp_2}{2} + P_2 - p_1 \right\}$$

In another embodiment, a LUT can be used to interpolate between two or more mathematical functions that are stored in two or more different LUT entries. In such an embodiment, one or more LUT entries can store an interpolation type in addition to a function type and parameters. Hence, the ith LUT entry $n_i$ effectively stores a function $f_{i+1}(X)$ and an interpolation type $g_i$. The interpolation type $g_i$ can be, for example, linear, cubic, sinc, etc. If the interpolation type $g_i$ is linear, for example, then $$g_i(f_i(x),$$
$$f_{i+1}(X)) = v \cdot f_i(x) + (1-v) \cdot f_{i+1}(x),$$
where
$$v = \frac{x - n_i}{n_{i+1} - n_i}.$$

Per-Color Selection of LUT Density

The effect of the hybrid polynomial interpolation approach described above can alternatively be achieved by using a common LUT of output signal values, i.e., a LUT that does not contain functions, slopes, etc. In the above description, it was stated that the interpolation functions for the less-influencing color channels can be less complex than the interpolation function for the most-influencing color channel; and therefore, the interpolation functions for the less-influencing color channels can be first-order polynomials while the interpolation function for the most-influencing color channel is a second-order polynomial.

However, instead of using more or less complex functions, an alternative approach which achieves essentially the same effect is to increase or reduce the size of the LUT grid, so that: 1) in the 3D LUT of the r output, there are more entries (vertices) in the R input axis than in the G or B axes; 2) in the 3D LUT of the g output, there are more entries in the G input axis than in the R or B axes; and/or 3) in the 3D LUT of the b output, there are more entries in the B input axis than in the R or G axes. Hence, the density of the input/output mapping function (i.e., the number of bins in a particular color's transformation LUT) can be selected separately for each input color. This approach allows the output accuracy to be adjusted on a per-color basis.

In one embodiment, each input dimension is a color component of the input signal, and a separate transformation LUT is defined for each output color component. The traditional 3D LUT of rgb tuplets (one dimension for each R, G, B input value) can be restructured into three 3D LUTs for generating the r, g and b outputs, respectively. For example, each LUT stores the mapped result of an input sample with R, G, or B chromaticity to the combined r, g or b output value to which it is transformed.

Thus, assuming RGB color space as an example, one LUT is used to produce the red output r, a second LUT is used to produce green output g, and a third LUT is used to produce the blue output b. The separate color LUTs are not necessarily symmetrical, nor do they need to have any particular number of dimensions. For example, LUTs can be employed whose dimensions are 9 by 17 by 12 bins. The best dimensions for the transformation LUTs are those that minimize color errors between the input image and the resulting color transformed output image. These dimensions can be defined by empirical measurements, or by the use of real-time in-device or factory calibration measurements.

In further illustrate this technique, assume that each input pixel value of the image being color mapped is represented by three color values, R, G and B. These values are used as an index into the three separate LUTs, each representing only one output color, r, g, or b, in its storage locations (grid points). At each storage location in the table there will be combinations of R, G, and B input values. Following this approach, for any given input pixel, only the first LUT is used to produce the r output value, only the second LUT is used to produce the g output value, and only the third LUT is used to produce the b output value. Mapping the input color component values into three separate output color LUTs allows each color to be individually addressed, and the density of each output color grid to be changed depending on the accuracy required to map a particular input color to a particular output color.

As noted above, the best dimensions for the transformation LUTs are those that minimize color errors between the input image and the resulting color transformed output image. These dimensions can be determined by, for example, empirical measurements.

The above discussion of various techniques for color space transformation applies to various embodiment of CC 3D LUT 460. NR 3D LUT 450 is different from CC 3D LUT in that, as discussed above, NR 3D LUT 450 outputs noise reduction factor and/or thresholds, or other noise reduction characteristics, rather than color values. However, NR 3D LUT 450 may also use the various interpolation methods discuss above, such as:
  1. LUT linear interpolation, using Tetrahedrons.
  2. LUT polynomial interpolation, using Tetrahedrons.
  3. LUT Hybrid polynomial-linear interpolation (new concept), using Tetrahedrons.

At least one embodiment of device 400 provides at least the same quality of noise reduction or better noise reduction as prior art solutions with a less complex or computation demanding solution. As resolution of pictures goes higher, the prior art solutions may require significantly more computing resources, while in an embodiment of device 400 the use of computing resources is linear with the size of the picture, dependent only on the number of pixels that comprise input image IN.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method for noise reduction, comprising:
   for each pixel of a noise-reduction lookup input image, wherein the noise-reduction lookup input image is based, at least in part, on an input image:
   determining at least one noise reduction component for the pixel by providing to a three-dimensional pixel value of the pixel, wherein the noise-reduction three-dimensional look up table converts the three-dimensional pixel value into the at least one noise reduction component based on the pixel value; and
   performing noise reduction on the input image using the determined noise reduction components.

2. The method of claim 1, wherein
   the at least one noise reduction component is at least one of a noise reduction factor or a noise reduction threshold.

3. The method of claim 1, wherein
   the at least one noise reduction component includes a noise reduction factor and a noise reduction threshold.

4. The method of claim 1, wherein
   the at least one noise reduction component includes an index of a noise reduction filter kernel.

5. The method of claim 1, wherein
   determining the at least one noise reduction component for each pixel includes:
   if the noise-reduction three-dimensional look-up table includes the at least one noise reduction component at the three-dimensional pixel value employing the value at the location,
   else
      employing interpolation to determine the value of the at least one noise reduction component at the three-dimensional pixel value based on at least two values on the noise-reduction three-dimensional look-up table near the three-dimensional pixel value.

6. The method of claim 1, further comprising:
   generating the noise-reduction lookup input image by low-pass filtering the input image.

7. The method of claim 1, further comprising:
   employing a color correction three-dimensional look-up table to generate a color-corrected image from the input image; and
   generating the noise-reduction lookup input image by low-pass filtering the color-corrected image.

8. The method of claim 1, wherein determining at least one noise reduction component for the pixel includes determining at least one noise reduction component for each color component of the pixel.

9. The method of claim 8, wherein the noise-reduction lookup input image is a red-green-blue (RGB) image, and wherein the color components of the noise reduction lookup input image are red, green, and blue.

10. An device for noise reduction, comprising:
    a noise-reduction three-dimensional look-up table that is arranged to receive a noise-reduction look-up input image that is based, at least in part, on an input image; and further arranged to: for each pixel of the noise-reduction lookup input image, determine at least one noise reduction component for the pixel by converting a three-dimensional pixel value of the pixel into the at least one noise reduction component; and
    a noise reduction unit that is arranged to perform noise reduction on the input image using the determined noise reduction components.

11. The device of claim 10, wherein
    the at least one noise reduction component is at least one of a noise reduction factor or a noise reduction threshold.

12. The device of claim 10, wherein
    the at least one noise reduction component includes a noise reduction factor and a noise reduction threshold.

13. The device of claim 10, wherein
    the at least one noise reduction component includes an index of a noise reduction filter kernel.

14. An article of manufacture including a processor-readable medium having processor-executable code stored therein, which when executed by one or more processors, enables actions for noise reduction, comprising:
    for each pixel of a noise-reduction lookup input image, wherein the noise-reduction lookup input image is based, at least in part, on an input image:
    determining at least one noise reduction component for the pixel by providing to a noise-reduction three-dimensional look up table a three-dimensional pixel value that is associated with the color of the pixel, wherein the noise-reduction three-dimensional look up table converts the three-dimensional pixel value into the at least one noise reduction component for each color component based on the pixel value; and
    performing noise reduction on the input image using the determined noise reduction components.

15. The article of manufacture of claim 14, wherein
    the at least one noise reduction component is at least one of a noise reduction factor or a noise reduction threshold.

16. The article of manufacture of claim 14, wherein
    the at least one noise reduction component includes a noise reduction factor and a noise reduction threshold.

17. The article of manufacture of claim 14, wherein
    the at least one noise reduction component includes an index of a noise reduction filter kernel.

* * * * *

UNITED STATES PATENT AND TRADEMARK OFFICE
CERTIFICATE OF CORRECTION

PATENT NO. : 8,106,972 B2
APPLICATION NO. : 12/355713
DATED : January 31, 2012
INVENTOR(S) : Dudi Vakrat et al.

It is certified that error appears in the above-identified patent and that said Letters Patent is hereby corrected as shown below:

In column 6, line 44, delete "$D\dot{}Q^D=\sim206$," and insert -- $D\dot{}Q^D=206$, --, therefor.

In column 6, line 64, delete "six-(Prism)" and insert -- six-(prism) --, therefor.

In column 7, line 28, delete "CYMK" and insert -- CMYK --, therefor.

In column 7, line 29, delete "outputp" and insert -- output p --, therefor.

In column 7, line 32, delete "tetahedron1, tetahedron2 and tetahedron3," and insert -- tetrahedron1, tetrahedron2 and tetrahedron3, --, therefor.

In column 7, lines 33-34, delete "tetahedron4, tetahedron5 and tetahedron6." and insert -- tetrahedron4, tetrahedron5 and tetrahedron6. --, therefor.

Signed and Sealed this
Seventeenth Day of July, 2012

David J. Kappos
*Director of the United States Patent and Trademark Office*

In column 8, lines 58-62, delete

"$r = P_{r,000} + \Delta_{r,t} + \Delta_{r,u} + \Delta_{r,v} = P_{r,0000} + s_{r,t} \cdot t + s_{r,u} \cdot u + s_{r,v} \cdot v$ $g = P_{g,000} + \Delta_{g,t} + \Delta_{g,u} + \Delta_{g,v} = P_{g,0000} + s_{g,t} \cdot t + s_{g,u} \cdot u + s_{g,v} \cdot v$ $b = P_{b,000} + \Delta_{b,t} + \Delta_{b,u} + \Delta_{b,v} = P_{b,0000} + s_{b,t} \cdot t + s_{b,u} \cdot u + s_{b,v} \cdot v$" and insert -- $r = P_{r000} + \Delta_{r,t} + \Delta_{r,u} + \Delta_{r,v} = P_{r000} + s_{r,t} \cdot t + s_{r,u} \cdot u + s_{r,v} \cdot v$ $g = P_{g000} + \Delta_{g,t} + \Delta_{g,u} + \Delta_{g,v} = P_{g000} + s_{g,t} \cdot t + s_{g,u} \cdot u + s_{g,v} \cdot v$ $b = P_{b,000} + \Delta_{b,t} + \Delta_{b,u} + \Delta_{b,v} = P_{b,000} + s_{b,t} \cdot t + s_{b,u} \cdot u + s_{b,v} \cdot v$ --, therefor.

In column 9, line 35, delete "$f_{1+1}(X)$," and insert -- $f_{i+1}(X)$, --, therefor.

In column 9, line 52, delete "$\Gamma_{x,y}$" and insert -- $\Gamma_{y,x}$ --, therefor.

In column 10, line 57, delete "$\Gamma_{g,v}$" and insert -- $\Gamma_{g,u}$ --, therefor.

In column 11, line 27, delete "$\gamma_{r,t}$" and insert -- $\Gamma_{r,t}$ --, therefor.

In column 12, line 7, delete "imlemention" and insert -- implementation --, therefor.

In column 12, line 25, delete "polymomial" and insert -- polynomial --, therefor.

In column 12, line 31, delete "$(R-n_1)=1$" and insert -- $(R-n_1)=0$ --, therefor.

In column 14, line 4, delete "Binput" and insert -- B input --, therefor.